Patented Oct. 27, 1942

2,300,291

UNITED STATES PATENT OFFICE 2,300,291

PETROLEUM PRODUCTS

Samuel Edward Jolly, Prospect Park, Pa., assignor to Sun Oil Company, Philadelphia, Pa., a corporation of New Jersey No Drawing. Application September 20, 1940,
Serial No. 357,661

27 Claims. (Cl. 252—51)

My invention is a new composition of matter, namely, a novel halogenated nitrile, or, alternatively, a halogenated nitrile-hydrocarbon mixture, which may be derived from those mixtures of acids which naturally occur in petroleum including particularly those acids which are found during the process of refining. Apart from the source from which such purified nitriles are derived, they have combinations of characteristics which distinguish them from nitriles derived from acids of animal or vegetable origin, namely: their chemical composition, their molecular weight, their boiling ranges, their specific gravity and their refractive indices. I have discovered that such nitriles, when halogenated, while useful for other purposes, are of particular value as addition agents to lubricating oils and greases, in which they are soluble in all proportions. The addition of a very small proportion of such halogenated nitriles to ordinary lubricating oil converts it into an extreme pressure lubricant adapted for use under the severest operating conditions, such as in hypoid gears. The difficulty with which such nitriles are hydrolized makes them especially valuble as lubricants, as they do not readily form corrosive products as do the esters of the fatty acids. Owing to their stability against hydrolysis they may be added to greases without substantially altering the alkalinity of the grease.

The process of producing my new composition will first be described as applied to a mixture of petroleum acids and petroleum hydrocarbon as a starting material. By petroleum acids I intend to be understood as including such acids as usually occur in petroleum and particularly naphthenic acids (hereinafter more particularly described) which are formed or isolated during the refining process according to a number of patents of the prior art, such as the patents to Terrell et al., No. 2,056,913, Angstadt No. 2,013,619 and No. 1,931,880, or Alleman No. 1,931,855, No. 1,694,461 and No. 1,694,463.

A mixture of such petroleum acids with petroleum hydrocarbons is delivered to a reaction vessel made of glass, stainless steel, enameled lined metal or any other material that will not be attacked by the products to be reacted. Preferably the vessel is provided with a long narrow neck or cylinder in order to provide for expansion and particularly to afford a longer period of contact between the gas and the liquid.

After the reaction vessel is loaded with the above mixture, it is heated until a temperature of from 200° C. to 400° C. (preferably about 350° C.) is attained. Ammonia is introduced at the bottom of the reaction chamber, preferably in a finely divided state, as, for example, through a tube provided with a diffusion plate; or a rotating stirrer, such as a "turbo mixer," may be used.

At the top of the neck or cylinder provision is made for condensing and collecting any water that is split off, as well as any other material which is volatile or is carried over by entrainment. A convenient arrangement includes a condenser provided with a water jacket. The water is separated and the organic material returned to the reaction chamber.

The reaction may be carried on at atmospheric pressure, but if the boiling point of the starting material is below the desired reaction temperature, a higher pressure is desirable. A pressure of about 75 lbs. per square inch is sufficient in most cases. The reaction may be carried out in the presence of dehydrating catalysts such as silica gel, alumina, thorium oxide, or like substances.

The reactions which take place between the petroleum acids and ammonia in forming nitriles involve three stages: first, the formation of the ammonium salt of the petroleum acids; second, splitting off water from this ammonium salt and forming the amide; and third, splitting off water from the amide to form the nitrile. These stages may be represented as follows:

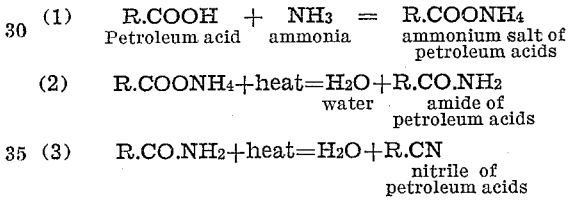

(1)    $\text{R.COOH} + \text{NH}_3 = \text{R.COONH}_4$
     Petroleum acid    ammonia    ammonium salt of petroleum acids (2)    $\text{R.COONH}_4 + \text{heat} = \text{H}_2\text{O} + \text{R.CO.NH}_2$
     water    amide of petroleum acids (3)    $\text{R.CO.NH}_2 + \text{heat} = \text{H}_2\text{O} + \text{R.CN}$
     nitrile of petroleum acids When water is no longer split off the reaction is complete.

Instead of utilizing as a starting material a mixture of petroleum acids and petroleum hydrocarbons, oil-free petroleum acids may be used. These may be separated from a mixture of hydrocarbons and acids by any desired method, such as by known methods of extraction with solvents. Or the hydrocarbons may be separated from the original mixture of hydrocarbons and alkali metal soaps, as by known solvent extraction, and the soaps then acidified. Purified petroleum acids having a saponification number of about 182.5 are produced by known methods and these may be used as the starting material. Other petroleum acids having smaller saponification numbers and containing varying percentages of hydrocarbons are also produced by known methods and these also may be used as starting materials. For example, petroleum acids are known that have a saponification number of 130 and contain about 40% of hydrocarbons. Any starting mixture of petroleum acids containing hydrocarbons should not contain over 50% of hydrocarbons.

If purified petroleum acids are used as a starting material the ammonia treatment above described is applied and the same reactions occur. The resultant product is the same except that with one starting material nitriles are formed and with the other starting material a mixture of nitriles and petroleum hydrocarbons is formed.

Nitriles may also be produced, by the method above described, from a mixture of unoxidized paraffin wax and oxidation products, preferably from a crude oxidation product of paraffin wax containing esters, acids, alcohols, other intermediate oxidation products and unoxidized hydrocarbons, as set forth in an application filed by me October 11, 1939, Serial No. 298,980. The nitriles thus formed may be separated from the hydrocarbons with solvents in which the nitriles are soluble and in which the hydrocarbons are nearly or quite insoluble. However, the removal of the hydrocarbons is usually unnecessary. When nitriles are produced from the crude oxidation product of paraffin wax they usually contain about 30% of unoxidized hydrocarbon.

Nitriles may also be formed from paraffin wax by simultaneously passing air, or other oxygen-containing gas, and ammonia through molten paraffin wax, as described in the application hereinbefore mentioned.

Preparatory to the next step the nitriles may or may not be purified by known methods. Whether they are purified or not, and whether or not they are in admixture with petroleum hydrocarbons, they are dissolved in a suitable inert solvent such as carbon tetrachloride and chlorine passed through the material until the desired amount of chlorine is taken up. The reaction vessel may be of essentially the same type as that used for the preparation of the nitriles. The chlorine is introduced at the bottom of the reaction vessel in a fine state of subdivision, so that the reaction takes place rapidly. This may be done by a diffusor or a stirring device such as a "turbo mixer." The temperature of the reaction mixture is kept below about 60° C. The use of a solvent is desirable because the chlorinated nitriles are very viscous, and it is difficult to get intimate contact between the partially chlorinated nitrile and the chlorine. Any excess chlorine and hydrochloric acid may be removed by blowing the product with air, by heating under a vacuum, by washing with water, or by treating with a neutralizing agent such as quicklime or sodium carbonate. Use of one of the latter two reagents removes some of the loosely bound halogen, and such treatment may be preferred when the product is to be subjected to high temperature conditions. If desired, the product may be treated with decolorizing materials, such as filter clay, to improve the color. Usually it will suffice, after the desired amount of chlorine is introduced into the mixture, to remove the reaction product from the reaction vessel and wash it with water until neutral. The carbon tetrachloride or other solvent is recovered by distillation. The distillation may be conducted under reduced pressure.

In the unsaturated nitriles the chlorine is largely taken up by addition, whereas in the substantially saturated nitriles, such as the nitriles from the oxidation products of paraffin wax, the chlorine is largely taken up by substitution, hydrogen being split out of the molecule to form hydrogen chloride.

Where an exceptionally high chlorine content is desired, catalysts, such as iodine or iron, should be used.

While it is uneconomical to utilize halogens other than chlorine, it will be understood that nitriles embodying my invention may contain any halogen, namely, fluorine, bromine or iodine.

The amount of chlorine that may be introduced into the nitriles may vary from 5 to 50%, although it is rarely that it is desirable, for any purpose, for the nitrile to contain less than 10% or more than 45%.

Petroleum acids from which halogenated nitriles are derived as above described have an empirical formula $C_nH_{2n-x}O_2$ (or $$C_{n-1}H_{2n-x-1}.COOH)$$

in which $n$ is from about 13 to about 30 and $x$ is 4, 6, 8 or 10. The molecular weight of these acids is from about 220 to about 440. The acid number is from about 100 to about 230. The refractive index, $n_D$, varies from about 1.4856 to about 1.5135 (20° C.). The acids have a boiling range from about 100° C. at 3 mm. to about 330° C. at 3 mm.

The nitriles prepared from these acids have the same general formula as the acids, except that the carboxyl group COOH is replaced by the nitrile group CN; forming $C_{n-1}H_{2n-x-1}.CN$. They might also be designated by the formula 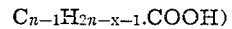 $C_nH_{2n-x}CN$, where $n$ is from about 12 to 29 and $x$ is any uneven number from 3 to 9. The molecular weight of the nitriles is about 19 less than the corresponding acids, or from about 200 to about 420. The boiling range of the nitriles is from about 90° C. at 3 mm. to about 300° C. at 3 mm. The specific gravity of the nitriles is lower than that of the corresponding acid. For example, the gravity of a nitrile prepared from a purified acid having a gravity of $0.990^{20°\ C.}$ is $0.947^{20°\ C.}$. The nitriles have a refraction index, $n_D$, from about 1.4803 at 20° C. to about 1.4980 at 20° C.

The halogenated nitriles contain the same number of carbon atoms as the nitriles. They cannot be distilled without excessive decomposition, so that their boiling range cannot be stated. The halogenated nitriles range in gravity from about $0.930^{20°\ C.}$ to about $1.295^{20°\ C.}$, the gravity depending on the composition of the nitrile and the halogen content.

When the chlorinated nitrile is added to lubricating oil to give an extreme pressure lubricant, it may be added in any amount varying from .1% to 25%. The amount introduced depends upon the chlorine content of the nitrile and the purpose for which the lubricant is to be used. If the lubricant is to be used under severe operating conditions, it is desirable to use a comparatively large quantity of the chlorinated nitrile containing a comparatively small proportion of chlorine rather than a smaller quantity of the halogenated nitrile containing a comparatively large proportion of chlorine. The most desirable proportion of chlorine is between 10 and 20%. Products containing a relatively small proportion of chlorine are more stable than products containing a relatively large proportion of chlorine.

Nitriles, derived from petroleum acids, having the composition and characteristics above specified, have little or no value as addition agents to lubricating oil and greases so far as concerns imparting to them any extreme pressure quality. For example, when a 5 per cent. solution of a nitrile-hydrocrabon oil mixture, having a neutralization value of 130, was added to lubricating oil, it seized at 2000 pounds, indicating no improvement over the lubricating oil itself. Nitriles of purified acids derived from petroleum and nitriles of acids obtained from the oxidation products of paraffin wax acted similarly. When, however, these nitriles are halogenated as herein described so that they contain halogen (specifically chlorine) over 5% (preferably 10 to 20%, but permissibly higher), they exhibit strikingly different qualities. Thus, the addition to lubricating oil of two per cent. of a chlorinated nitrile derived from petroleum acids having a neutralization value of 130 (containing about 40% of hydrocarbons) gave a lubricant which stood 15,000 pounds pressure on the Almen machine without failure. 2.5 per cent. of the chlorinated nitrile of paraffin acids in lubricating oil also passed the Almen test with a maximum torque of about 50 foot pounds. Two per cent. of the chlorinated nitriles of purified acids, derived from petroleum, in lubricating oil also passed the Almen test.

It is known to add certain nitriles to lubricating oil for use in internal combustion engines to inhibit corrosion of the bearings. Operating conditions in such use are comparatively mild, maximum temperature reached by the lubricant not exceeding 300° F. and the maximum bearing pressure being substantially less than 2000 pounds per square inch. Such nitriles, or even nitriles produced as herein described, are, however, of no value as addition agents to lubricating oil to impart to it extreme pressure qualities, as, for example, in lubricating oil intended for use in hypoid gears, in which the pressure on the gear teeth has a minimum value of about 10,000 pounds per square inch and temperatures as high as 500° F. are not uncommon.

I am also aware that it is known to produce an unsaturated aliphatic carboxylic acid nitrile from a halogen-containing saturated aliphatic carboxylic acid nitrile containing 4 carbon atoms. My new composition, like the nitriles which I chlorinate to produce it, and like the petroleum acids from which the nitriles are preferably derived, contain from 13 or 14 to 29 or 30 carbon atoms, besides having other differentiating characteristics hereinbefore enumerated, and thus is a wholly different compound, intended and adapted for wholly different uses.

While for special uses the halogenated purified acids derived from petroleum may have advantages over the halogenated nitrile-petroleum hydrocarbon mixture, the latter is of substantially equal value as an addition agent to lubricating oil, and is of decided advantage in that the expense of separating oil-free acids from the starting mixture of hydrocarbons and acids may be avoided, thereby producing a novel composition at minimum expense.

I do not herein claim a lubricating oil to which has been added the hereindescribed halogenated nitriles or halogenated nitrile-petroleum hydrocarbon mixture, the same forming the subject matter of U. S. Patent No. 2,234,915, issued March 11, 1941, on an application filed by me October 11, 1939, Serial No. 298,979, of which this application is a continuation or division in part; but what I do herein claim, as new compositions, are the hereindescribed halogenated nitriles and halogenated nitrile-petroleum carbon mixtures, which are novel independent of the useful purpose to which I have found them more particularly adapted.

What I claim and desire to protect by Letters Patent is:

1. A new composition of matter derived from acids of the group having the empirical formula $C_nH_{2n-x}O_2$ in which $n$ is from about 13 to about 30 and $x$ is an even number from 4 to 10 and in which the carboxyl group COOH is replaced by the nitrile group CN and to which has been added a halogen.

2. A new composition of matter derived from acids of the group having the empirical formula $C_nH_{2n-x}O_2$ in which $n$ is from about 13 to about 30 and $x$ is an even number from 4 to 10 and in which the carboxyl group COOH is replaced by the nitrile group CN and to which has been added between 5 and 50 per cent. of a halogen.

3. A new composition of matter derived from acids of the group having the empirical formula $C_nH_{2n-x}O_2$ in which $n$ is from about 13 to about 30 and $x$ is an even number from 4 to 10 and in which the carboxyl group COOH is replaced by the nitrile group CN and having the property, when not less than 5% of a halogen is added thereto and when the thus produced halogenated nitrile is added to lubricating oil in small proportion, of converting such oil into an extreme pressure lubricant that will not seize at 15,000 pounds pressure under the Almen test.

4. A new composition of matter derived from acids of the group having the empirical formula $C_nH_{2n-x}O_2$ in which $n$ is from about 13 to about 30 and $x$ is an even number from 4 to 10 and in which the carboxyl group COOH is replaced by the nitrile group CN and to which has been added not less than 5% of a halogen.

5. A new composition of matter derived from a mixture of hydrocarbons and acids of the group having the empirical formula $C_nH_{2n-x}O_2$ in which $n$ is from about 13 to about 30 and $x$ is an even number from 4 to 10 and in which the carboxyl group COOH is replaced by the nitrile group CN and to which has been added a halogen.

6. A new composition of matter comprising a nitrile of the group having the empirical formula $C_{n-1}H_{2n-x-1}.CN$, in which $n$ is from about 13 to about 30 and $x$ is an even number from 4 to 10 and to which has been added a halogen.

7. A new composition of matter comprising a nitrile of the group having the empirical formula $C_{n-1}H_{2n-x-1}.CN$, in which $n$ is from about 13 to about 30 and $x$ is an even number from 4 to 10 and to which has been added between 5 and 50 per cent. of a halogen.

8. A new composition of matter comprising a nitrile of the group having the empirical formula $C_nH_{2n-x}CN$ in which $n$ is from about 12 to about 29 and $x$ is an uneven number from 3 to 9 and to which has been added a halogen.

9. A new composition of matter comprising a nitrile of the group having the empirical formula $C_nH_{2n-x}CN$ in which $n$ is from about 12 to about 29 and $x$ is an uneven number from 3 to 9 and to which has been added between 5 and 50 per cent. of a halogen.

10. A new composition of matter comprising a nitrile of the group having the empirical formula $C_{n-1}H_{2n-x-1}.CN$, in which $n$ is from about 13 to about 30 and $x$ is an even number from 4 to 10 and having the property, when not les than 5% of a halogen is added thereto and when the thus produced halogenated nitrile is added in small proportion to lubricating oil, of converting such oil into an extreme pressure lubricant that will not seize at 15,000 pounds pressure under the Almen test.

11. A new composition of matter comprising a nitrile of the group having the empirical formula $C_{n-1}H_{2n-x-1}.CN$, in which $n$ is from about 13 to about 30 and $x$ is an even number from 4 to 10 and to which has been added not less than 5% of a halogen.

12. A new composition of matter comprising a nitrile of the group having the empirical formula $C_nH_{2n-x}CN$ in which $n$ is from about 12 to about 29 and $x$ is an uneven number from 3 to 9 and having the property, when not less than 5% of a halogen is added thereto and when the thus produced halogenated nitrile is added in small proportion to lubricating oil, of converting such oil into an extreme pressure lubricant that will not seize at 15,000 pounds pressure under the Almen test.

13. A new composition of matter comprising a nitrile of the group having the empirical formula $C_nH_{2n-x}CN$ in which $n$ is from about 12 to about 29 and $x$ is an uneven number from 3 to 9 and to which has been added not less than 5% of a halogen.

14. A new composition of matter comprising a mixture of hydrocarbons and a nitrile of the group having the empirical formula $C_{n-1}H_{2n-x-1}.CN$, in which $n$ is from about 13 to about 30 and $x$ is an even number from 4 to 10 and to which has been added a halogen.

15. A new composition of matter comprising a mixture of hydrocarbons and a nitrile of the group having the empirical formula $C_nH_{2n-x}CN$ in which $n$ is from about 12 to about 29 and $x$ is an uneven number from 3 to 9 and to which has been added a halogen.

16. A new substantially sulfur-free composition of matter derived from acids of the group having the empirical formula $C_nH_{2n-x}O_2$ in which $n$ is from about 13 to about 30 and $x$ is an even number from 4 to 10 and in which the carboxyl group COOH is replaced by the nitrile group CN and to which has been added a halogen.

17. A new composition of matter derived from acids of the group having the empirical formula $C_nH_{2n-x}O_2$ in which $n$ is from about 13 to about 30 and $x$ is an even number from 4 to 10 and in which the carboxyl group COOH is replaced by the nitrile group CN and having the property, when there is added thereto only a halogen and when the thus produced halogenated nitrile is added to lubricating oil in small proportion, of converting such oil into an extreme pressure lubricant that will not seize at 15,000 pounds pressure under the Almen test.

18. A new composition of matter derived from acids of the group having the empirical formula $C_nH_{2n-x}O_2$ in which $n$ is from about 13 to about 30 and $x$ is an even number from 4 to 10 and in which the carboxyl group COOH is replaced by the nitrile group CN and to which has been added not less than 5% of only a halogen.

19. A new substantially sulfur-free composition of matter derived from a mixture of hydrocarbons and acids of the group having the empirical formula $C_nH_{2n-x}O_2$ in which $n$ is from about 13 to about 30 and $x$ is an even number from 4 to 10 and in which the carboxyl group COOH is replaced by the nitrile group CN and to which has been added a halogen.

20. A new substantially sulfur-free composition of matter comprising a nitrile of the group having the empirical formula $C_{n-1}H_{2n-x-1}.CN$, in which $n$ is from about 13 to about 30 and $x$ is an even number from 4 to 10 and to which has been added a halogen.

21. A new substantially sulfur-free composition of matter comprising a nitrile of the group having the empirical formula $C_nH_{2n-x}CN$ in which $n$ is from about 12 to about 29 and $x$ is an uneven number from 3 to 9 and to which has been added a halogen.

22. A new composition of matter comprising a nitrile of the group having the empirical formula $C_{n-1}H_{2n-x-1}.CN$, in which $n$ is from 13 to about 30 and $x$ is an even number from 4 to 10 and having the property, when there is added thereto only a halogen and when the thus produced halogenated nitrile is added in small proportion to lubricating oil, of converting such oil into an extreme pressure lubricant that will not seize at 15,000 pounds pressure under the Almen test.

23. A new composition of matter comprising a nitrile of the group having the empirical formula $C_{n-1}H_{2n-x-1}.CN$, in which $n$ is from about 13 to about 30 and $x$ is an even number from 4 to 10 and to which has been added not less than 5% of only a halogen.

24. A new composition of matter comprising a nitrile of the group having the empirical formula $C_nH_{2n-x}CN$ in which $n$ is from about 12 to about 29 and $x$ is an uneven number from 3 to 9 and having the property, when there is added thereto only a halogen and when the thus produced halogenated nitrile is added in small proportion to lubricating oil, of converting such oil into an extreme pressure lubricant that will not seize at 15,000 pounds pressure under the Almen test.

25. A new composition of matter comprising a nitrile of the group having the empirical formula $C_nH_{2n-x}CN$ in which $n$ is from about 12 to about 29 and $x$ is an uneven number from 3 to 9 and to which has been added not less than 5% of only a halogen.

26. A new substantially sulfur-free composition of matter comprising a mixture of hydrocarbons and a nitrile of the group having the empirical formula $C_{n-1}H_{2n-x-1}.CN$, in which $n$ is from about 13 to about 30 and $x$ is an even number from 4 to 10 and to which has been added a halogen.

27. A new substantially sulfur-free composition of matter comprising a mixture of hydrocarbons and a nitrile of the group having the empirical formula $C_nH_{2n-x}CN$ in which $n$ is from about 12 to about 29 and $x$ is an uneven number from 3 to 9 and to which has been added a halogen.

SAMUEL EDWARD JOLLY.